United States Patent [19]

Clinton et al.

[11] Patent Number: 5,590,960
[45] Date of Patent: Jan. 7, 1997

[54] ONE TANK PAINT MAKEUP PROCESS USING A RECIRCULATION LOOP WITH LIQUID INJECTION

[75] Inventors: Peter M. Clinton, Media, Pa.; Nathan Cloud; Frank Rohrbacher, both of Wilmington, Del.

[73] Assignee: E. I. Du Pont de Nemours and Company, Wilmington, Del.

[21] Appl. No.: 619,875

[22] Filed: Mar. 20, 1996

Related U.S. Application Data

[63] Continuation of Ser. No. 396,041, Feb. 28, 1995, abandoned, which is a continuation-in-part of Ser. No. 146,815, Nov. 4, 1993, abandoned.

[51] Int. Cl.⁶ ................................................. B01F 15/02
[52] U.S. Cl. ............................................ 366/134; 366/136
[58] Field of Search ...................................... 366/131, 132, 366/134, 136, 137, 140, 150.1, 154.1, 155.1, 159.1, 160.1, 160.2, 162.1, 605; 137/2–4, 92

[56] References Cited

U.S. PATENT DOCUMENTS

| | | | |
|---|---|---|---|
| 1,781,435 | 11/1930 | Carper | 366/137 X |
| 2,391,858 | 1/1946 | Auer | 366/136 |
| 2,608,392 | 8/1952 | Bowman | 366/137 |
| 2,915,299 | 12/1959 | Woebcke | 366/154 X |
| 3,244,407 | 4/1966 | Obergfell et al. | 366/155 |
| 3,326,815 | 6/1967 | Werner et al. | 366/155 X |
| 3,415,264 | 12/1968 | Brown et al. | 137/92 |
| 3,425,667 | 2/1969 | Schutte et al. | 366/140 X |
| 3,830,473 | 8/1974 | Lieferman et al. | 366/136 |
| 3,897,939 | 8/1975 | Hostettler et al. | 366/137 X |
| 3,999,741 | 12/1976 | Richards | 366/131 |
| 4,171,224 | 10/1979 | Verhille et al. | 366/131 X |
| 4,299,501 | 11/1981 | Patil et al. | 366/159 X |
| 4,362,377 | 12/1982 | Yoshida et al. | 366/137 X |
| 4,403,866 | 9/1983 | Falcoff et al. | 366/160 X |
| 4,498,784 | 2/1985 | Bernhardsson et al. | 366/136 X |
| 4,515,482 | 5/1985 | Schadewald | 366/136 |
| 5,246,287 | 9/1993 | Isherwood et al. | 366/136 X |
| 5,348,390 | 9/1994 | Schertenleib | 366/136 |

OTHER PUBLICATIONS

Johnson, J., et al., Attritor Grinding and Dispensing Equipment, Polymers Paint Colour Journal, p. 463, Jul. 7, 1982.

Roelofsen, D. Developments in Dispensing Technology, Europe Coating Journal, p. 143, 1991.

*Primary Examiner*—Charles E. Cooley
*Attorney, Agent, or Firm*—Rodney B. Carroll

[57] ABSTRACT

Paint compositions useful for automotive applications are made using a one tank process with an associated circulation loop. Addition ports located in close proximity to a zone of high speed mixing allows for rapid blending of materials into the process stream. A bypass subloop connected to the circulation loop will divert paint to grinding apparatus achieve addition of pigments on-line. Instrumentation attached to the circulation loop directly measures the process stream parameters such as viscosity, pH, temperature, and pressure.

3 Claims, 2 Drawing Sheets

ONE TANK PAINT MAKEUP PROCESS USING A RECIRCULATION LOOP WITH LIQUID INJECTION

This application is a file wrapper continuing application under 37 CFR §1.62 of Applicants' application Ser. No. 08/396,041, now abandoned, filed Feb. 28, 1995, which is a continuation in part of application Ser. No. 08/146,815, now abandoned, filed Nov. 4, 1993.

FIELD OF THE INVENTION

This invention is related to a paint making process, more particularly to a process in which finished product is made in a single processing tank using a recirculation mode with liquid injection capabilities.

BACKGROUND OF THE INVENTION

Automotive companies are requiring paint suppliers to meet stricter specifications involving paint cleanliness, color, cost and delivery schedule as they face increasingly stringent quality requirements in the marketplace. Consumers are demanding greater durability and color in the automotive finishes. At the same time, government regulations are becoming more demanding of reductions in airborne emissions. Consequently, waterborne and high solids paint formulations are becoming increasingly more important.

The conventional paint manufacturing process consists of mixing or blending resins, solvents, intermediates and millbases in large tanks with slow paddle mixers. This process is especially efficient for low-solid, solvent-based finishes since the high solvent content in these formulations allows for a wide compatibility among the various ingredients.

In high solid and waterborne formulations, on the other hand, there is little solvent present to compatabilize the various ingredients. Additionally, water borne formulations contain high levels of expensive, hydrophobic, and hard-to-grind pigments. In addition, these formulations tend to higher viscosities, making the conventional manufacturing process of large tanks and paddle mixers inefficient and slow.

In addition, high solids or waterborne paint formulations present another manufacturing difficulty. Typically these formulations contain high levels of materials having an extremely narrow compatibility tolerances. Pigment "shocking" and "kickout," whereby components separate into separate phases within the mixing vessel, often results from localized incompatibility within the confinement of a mixing tank. Furthermore, millbase made at high solids and low solvent levels often flocculate when its incorporation into the mixture is slow. The resulting floculated mixture is "milky" in color with reduced pigment efficiency.

To overcome these formulating problems, difficult-to-incorporate materials are made into compatible mixtures off-line as intermediates and are combined together in a series of steps to make a finished product. These additional mixing steps consume time and money. In addition, each intermediate step increases loss of raw materials as well as the possibility of decreased quality as intermediates are transferred from tank to tank.

SUMMARY OF THE INVENTION

Pursuant to the present invention, high quality automotive finishes can be prepared without the need for multiple intermediate mixtures. Significant savings in time and expense can be achieved by the elimination of such mixtures prior to final formulation.

Within a processing vessel equipped with mixing means, resins and dispersions are blended. This first group of materials is fed from an outlet port in the processing vessel to a circulation loop. A circulation loop with an associated pump is connected to the processing vessel to allow the mixture to circulate through a zone of high speed mixing, typically a homogenizer, i.e., a high shear mixing zone in the circulation loop and back into the processing vessel. Attached to this circulation loop are one or more injection ports through which material can be added into the process stream. All of the materials in the circulation loop are passed through the high shear mixing zone. The circulation loop also contains means for filling a container with finished product, or for addition of bulk material to the process stream. A finish having a uniform coloration is recovered from the circulation loop.

Optionally, attached to the circulation loop can be a bypass subloop which allows diversion of some or all of the material within the circulation loop to enter this subloop. In this subloop is a means for grinding particulates, typically a media mill. Pigments can be added to the process stream in the circulation loop or bypass subloop for recirculation to the media mill.

Additives to the formulation, particularly those with narrow compatibility tolerances, such as predispersed mill bases, thickene is and organic solvents, can be introduced to the process stream through injection ports located on the recirculation loop. Such addition can be achieved through ports located in close proximity to the zone of high shear mixing to maximize blending and minimize incompatibility.

Measurement instrumentation for pH, viscosity, temperature, pressure, flow rate and color can be attached to the circulation loop at appropriate locations.

The manufacturing process can be controlled through computer means. A typical computer control system can control pump speeds, rates and quantities of additions of components, and measurements taken on-line by various instrumentation as noted directly above.

DETAILED DESCRIPTION OF THE INVENTION

Figure 1:
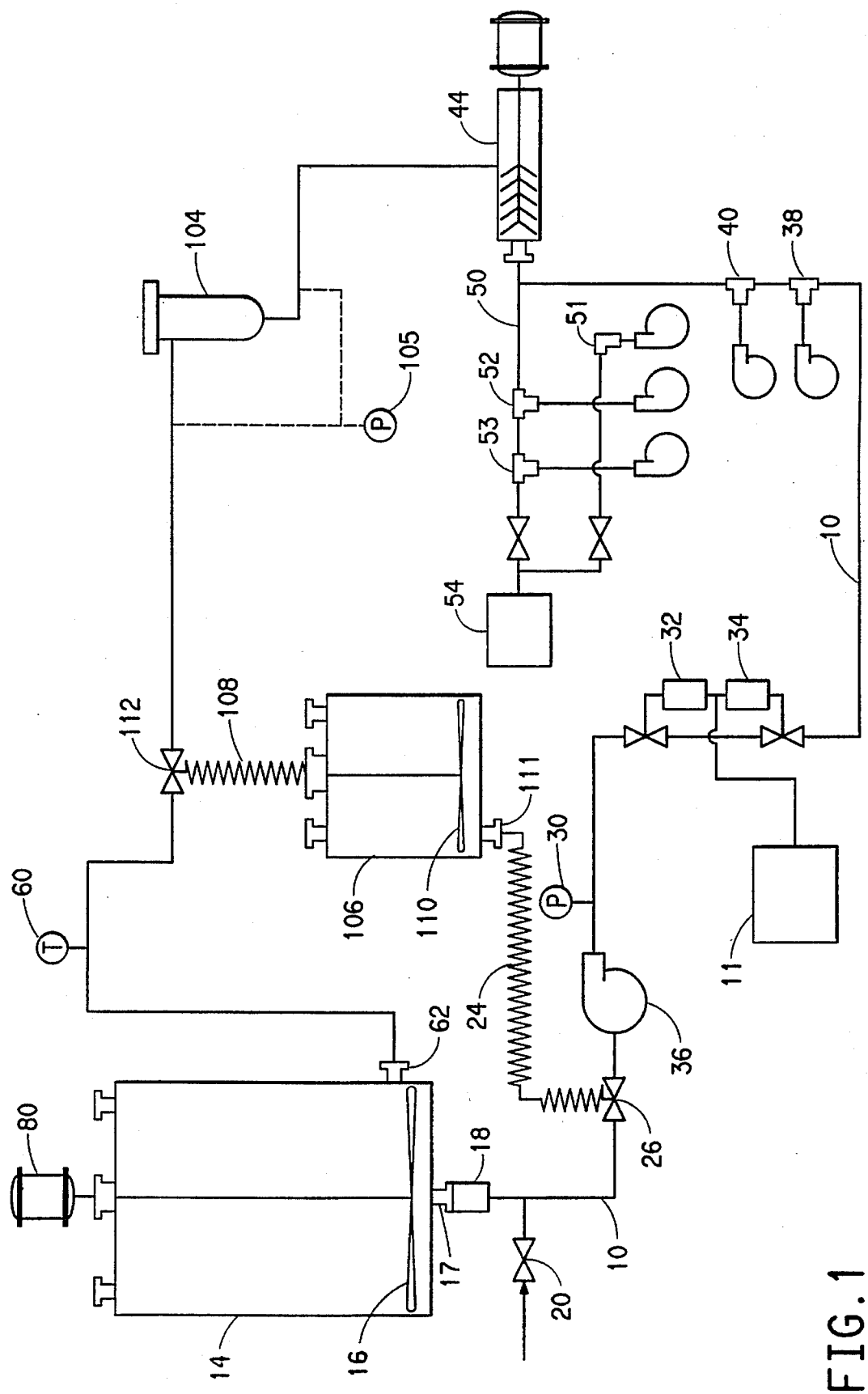
FIG. 1 is a schematic representation of the claimed invention.

FIG. 1 shows the claimed invention with associated instruments. Container 14 can be a fixed, portable or modified tank, such as a shipping container or a universal portable tank (UPT), of various sizes and geometrical designs. Typically a 1200 gallon cylindrical tank with a conical or spherical bottom is used. Container 14 has associated low shear mixing means 16, typically a dual bladed impeller with variable drive motor 80 typically operated at less than 200 rpm.

Premix, typically consisting of processing fluids of dispersion resins and additives, is placed into container 14. Uniforming of the premix is achieved and maintained through mixing means 16. Wetted pigments are added to container 14 by conventional means and mixed with other components within container 16. Materials exit container 14 through outlet port 18 located near or at the bottom of container 14.

Attached to outlet port 18 is circulation loop 10, typically a one-and-half inch stainless steel tubing with outlet end 17 attached to container 14, preferably near or within the zone of mixing created by mixing means 16. Pumping means 36, typically a Robbins Myers Co. Moyno progressive pump with 40 GPM capacity, attached to circulation loop 10 allows material to circulate within loop 10.

Attached to circulation loop 10 is addition valve 20 which can be utilized for the addition of materials to the process stream, for example, for bulk delivery of raw materials. It can also be used as a dedicated inlet port to reduce the risk of contamination, especially where incompatibility between materials may be present. Additionally, addition valve 20 may be used to add water or to flush the system when cleaning circulation loop 10.

Optionally, measurement instrumentation may be attached at appropriate locations to circulation loop 10. As known in the art, instrumentation used are constructed for Class 1, Division 1, Group C/D electrically classified environments. Such means can be operated manually or connected to a distributive control system 11 for intermittent or continuous readings.

As seen in FIG. 1, pressure measurement means 30, typically a Rosemount Inc. model 1151DP6E2AB1L4T0086, is connected to circulation loop 10. Viscosity measurement means 32, typically a Brookfield Engineering Laboratories, Inc. model TT200 in-line viscometer, is attached to recirculation loop 10 so as to allow flow of material through the instrument. Connected in series to viscosity measurement means 32 is pH meter 34, typically Lakewood Instruments model 1020 analyzer.

Injection port 38 is attached to recirculation loop 10. Injection port 38 allows for precise addition on-line of materials, e.g., color additions. Injection port 40 connected to recirculation loop 10 is used for additions of materials to be added in moderate quantities, e.g., water. Measurement of the quantity of material added through injection ports 38 and 40 can be accomplished either volumetrically through pumping means such as a positive displacement pump or by weight measurements. Such additions can be done mechanically or through computer control system 11.

During manufacture of the paint, it is sometimes necessary to add materials which are incompatible with materials already present within the process stream. Such additives may cause localized incompatibility within the material stream and it is desirable to mix these additives as quickly as possible into the material stream.

When the materials to be added are liquids, rapid mixing can be accomplished through rotor/stator mixing means 44 which create a zone of moderate shear, e.g., a Ross Horizontal In-Line Mixer Emulsifier Special Model ME 410 manufactured by Charles Ross and Son of Hauppauge, N.Y., when operated at above 2000 rpm.

Materials for which it is desirable to have a minimal period of residence between addition and incorporation into the process stream are introduced through addition ports 51,52 and 53 connected to pipe 50 which leads into mixing means 44. While FIG. 1 shows three such injection ports in series, such addition ports can vary in number and location relative to mixing means 44. Addition ports 51,52, and 53 can be used as general or dedicated addition ports. Water can be flushed into pipe 50 using water source 54 and a pump, not shown, to ensure that the entire quantity of the additive reaches the material stream.

Located downstream from homogenizer 44 is temperature measurement means 60, typically a thermocouple. Placement of temperature measurement means can typically be anywhere on circulation loop 10 as convenience or system parameters dictate. Operation of temperature measurement means 60 can be done manually or through computer control, i.e. distributive control system 11.

Filter 104 connected to circulation loop 10 filters the process stream. The sieve size of the filter is dependent upon the materials within the process stream so as to avoid premature fouling of the filter mechanism while removing undesirable particulates from the process stream. Attached to filter 104 is filter assembly differential pressure transmitter 105, typically Rosemount Inc. model 1151DP6E2AB1L4T0086, to measure the differential pressure across filter means 104 to avoid over pressurization of filter means 104.

As a second embodiment of the present invention, hose 108 is attached to circulation loop 10 by valve 112. Hose 108 is typically of a flexible material to allow for connection to various configurations of container 106 to which material will be charged. Container 106 may be, for example, a shipping tank, a holding tank or small volume vessels. There may be certain circumstances, however, where hose 108 is fixed or rigid in nature.

Alternatively, container 106 is used to add semi-bulk or bulk materials to the process stream through hose 24 connected to container 106 at connection 111. Again, hose 24 is typically of a flexible material for ease of use but can be fixed or rigid. Container 106 may have mixing means 110, such as a paddle mixer, to agitate the contents of container 106 prior to or during discharge of the contents. Additions are made through valve 26 connected to circulation loop 10. Measurement of the quantity of material added to the process stream can be accomplished either volumetrically through pumping means such as a positive displacement pump or by weight measurements. Such additions can be done manually or through computer control means 11.

The inlet end of circulation loop 10 is connected to container 14 at inlet port 62. Inlet port 62 is typically located in close proximity to mixing means 16 within container 14 so as to maximize efficient blending of materials within container 14.

Figure 2:
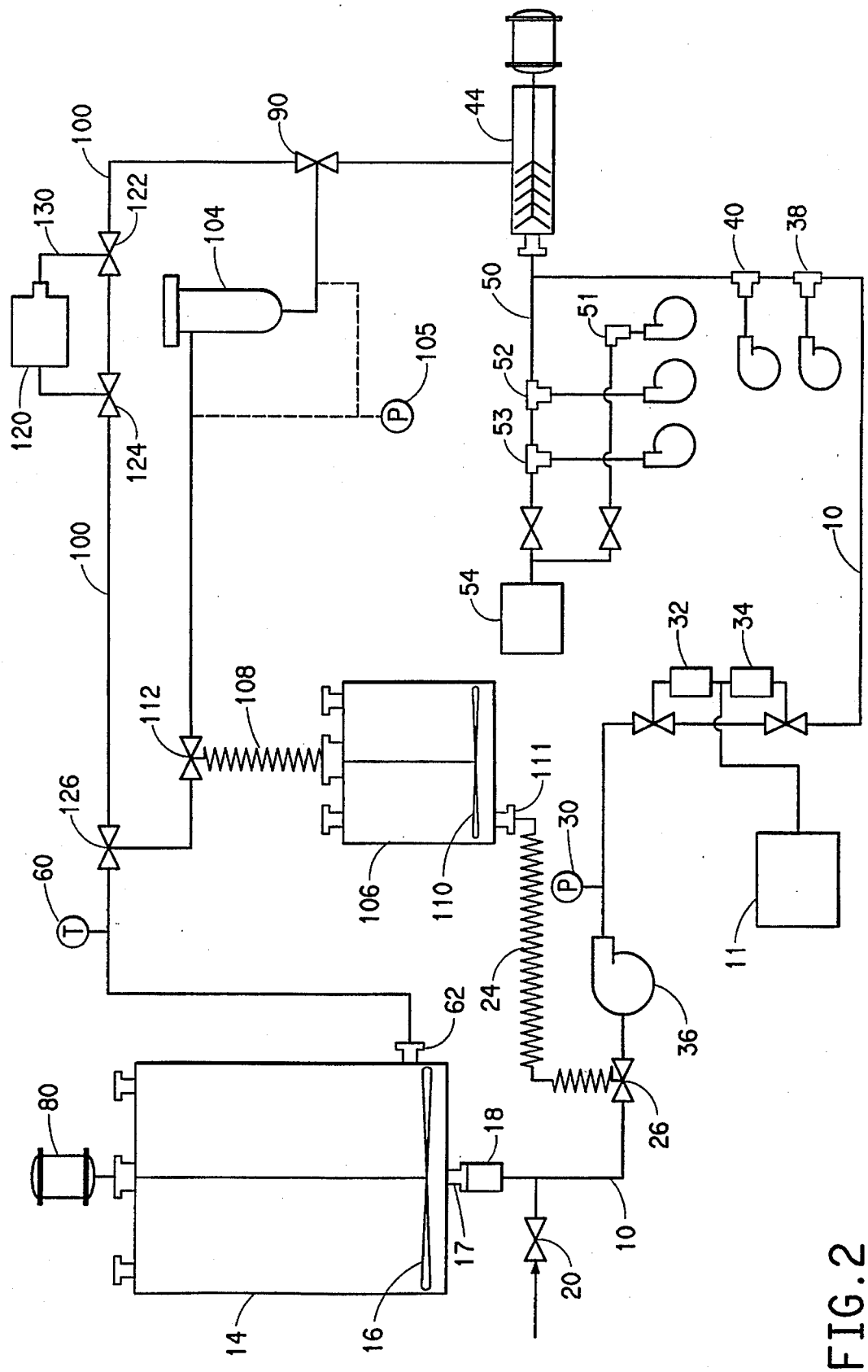
FIG. 2 is a schematic representation of an second embodiment of the claimed invention.

As shown in FIG. 2, some or all of the process stream can be diverted from circulation loop 10 into bypass subloop 100 by means of valves 90 and 126. By-pass of filter 104 may also be necessary at some points of the formulation process.

When additions are pre-wetted powders or particulate aggregates, mixing means which have a high shear rate are desirable, e.g., a Netzch Inc. LMZ-25 agitated bead mill. Materials which enter the process stream through mixing means 44 are rapidly blended to minimize the risk of shocking or kick-out on-line.

In an alternate embodiment, as shown in FIG. 2, second mixing means 120 is attached to subloop 100, e.g., an agitated bead mill, on a separate loop 130. Valves 122 and 124 allow materials to be diverted into second mixing means 120 as necessary, e.g., deagglomeration of particulate material. Valves 122 and 124 can be operated manually or through computer control means 11.

Second mixing means 120 can be used in series with or be independent of mixing means 44 connected to circulation loop 10. There are circumstances where it is desirable to have mixing means 44 be a moderate shear mixer and have high shear capability on-line. This could be accomplished by having mixing means 44 be a homogenizer with second mixing means 120 be an agitated media mill.

Other details, objects and advantages of this invention will be apparent from the following non-limiting examples.

EXAMPLES

Examples

As a comparison Example, a batch of medium gray metallic paint was formulated using a conventional paint making process. Several components were made as intermediates off-line due to their incompatibility with other components in a conventional process. Nine intermediates were made off line at a total of 40% of the final volume. The formulation is listed in Table I.

TABLE I

| Ingredient | No. of Intermediate | Volume |
| --- | --- | --- |
| Acrylic Latex |  | 414 |
| Flow Additives |  | 46.5 |
| Latex |  | 24.5 |
| Colorants | 3 | 40.5 |
| Melamine Crosslinker | 2 | 29.8 |
| UV Screener |  |  |
| Rheology Control Additive | 1 | 77 |
| Mica Flake Dispersion | 2 | 47 |
| Amine | 1 |  |
| Water |  | 148.5 |

A second batch of the same medium gray metallic paint was formulated using the present invention. The number of intermediates was decreased to 4 to a level of 5.2% of the final volume.

TABLE II

| Ingredient | No. of Intermediate | Volume |
| --- | --- | --- |
| Melamine Crosslinker |  | 74 |
| Acrylic Resin |  | 38 |
| Thickener |  | 10 |
| Acrylic Latex |  | 414 |
| Flow Additives |  | 465 |
| Latex |  | 24.5 |
| Colorants | 3 | 40.5 |
| UV Screeners |  | 4 |
| Rheology Control Additives |  | 8.2 |
| Amine |  | 2.8 |
| Mica Flake Dispersion | 1 | 17 |
| Water |  |  |

Each batch was tested for chip resistance, SAE J-400; paint adhesion, GM Test Specification TM 55-3; resistance to water and humidity, GM Test Specification TM 55-3; gloss, ASTM Method D-523-67; Distinctivehess-of-Image, GM Test Specification TM 204-M; viscosity, GM Test Specification TM 9-K; pH, GM Test Specification TM 243-A; weight solids, GM Test Specification TM 221-Z; and VOC, GM Test Specification TM 225-A.

The results of the batch made under the present disclosed process fell within the specification ranges established by the batch made by the conventional process. In addition, the batch made by the present process reduced cleavage losses resulting in improved yields through a decrease of intermediates from nine to four and a significant decrease in cycle time.

EXAMPLE II

A 500 gallon batch of a dark blue waterborne formulation containing a titanium dioxide treated mica flake was prepared by convention methods. Five metal panels were sprayed under controlled conditions, flashed, sprayed with a clear coat and baked at 250 F for thirty minutes. Cratering was observed at unacceptable levels and the batch was rejected.

This mixture was circulated for three hours using the present invention at a rate of 30 gal per minute with the homogenizer set at 3600 rpm. The formulation was rebalanced for pH, color and viscosity. Panels were sprayed as above and showed no tendency toward cratering.

EXAMPLE III

A black millbase was formulated using high-color carbon black pigments dispersed in an acrylic dispersant resin. Extreme care must be taken to avoid flocculation of the pigment during paint production to achieve a jet black final color rather than a brown-black tone. When made in a convention process, the batch had a brown-black tone and was rejected.

To a 1200 gal mixing container was added acrylic latex, additives, melamine and solvents. The black millbase was added to the mixture at a rate of 1 gpm by directly injecting through an addition port of the present invention into a zone of high-intensity mixing created by a Ross Horizontal In-Line Mixer Emulsifier running at 1 gpm. The overall circulation rate was 40 gpm.

The resulting paint passed all specifications, including color and appearance.

What is claimed is:

1. An in-line process for preparing automotive finish comprising multi-staged introductions of materials including millbase, resins, dispersions, and solvents comprising the steps of (a) introducing a first group of materials selected from the group consisting of millbase, resins, dispersions, solvents, and pigments into a processing vessel having mixing means therein, (b) feeding said materials from an outlet port in said processing vessel to a circulation loop which extends from said processing vessel and returns to said processing vessel, said circulation loop having attached thereto a mixer having a rotor cooperating with a stator to produce a moderate shear mixing zone and at least one port discharging directly into the moderate shear mixing zone, (c) feeding additional materials into said circulation loop through said port, (d) passing all of the materials in said circulation loop through the moderate shear mixing zone in said circulation loop, (e) filtering all of the materials, and (f) recovering a finish having a uniform coloration from said circulation loop.

2. A process as claimed in claim 1 wherein all of said materials after passing through said moderate shear mixing zone are passed through an agitated media mill.

3. An in-line process for preparing automotive finish comprising multi-staged introductions of materials including millbase, resins, dispersions, and solvents comprising the steps of (a) introducing a first group of materials selected from the group consisting of millbase, resins, dispersions, solvents and pigments into a processing vessel having mixing means therein, (b) feeding said materials from an outlet port in said processing vessel to a circulation loop, said circulation loop having attached thereto a mixer having a rotor cooperating with a stator to produce a moderate shear mixing zone and at least one port discharging directly into the moderate shear mixing zone, (c) feeding additional materials into said circulation loop through said port, (d) passing all of the materials in said circulation loop through the moderate shear mixing zone in said circulation loop, (e) circulating said materials to a subloop tubulary connected to said circulation loop by a value, said subloop having an in-line agitated media mill to further mix said materials are said materials pass through the mill and are returned to said circulation loop, and (f) recovering a finish having a uniform coloration from said circulation loop.

\* \* \* \* \*

UNITED STATES PATENT AND TRADEMARK OFFICE
CERTIFICATE OF CORRECTION

PATENT NO. : 5,590,960
DATED : Jan. 7, 1997
INVENTOR(S) : Peter M. Clinton, Nathan Cloud, Frank Rohrbacher It is certified that error appears in the above-identified patent and that said Letters Patent is hereby corrected as shown below:

Claim 3 (b), column 6, line 67, after "loop," insert --said circulation loop extending from said processing vessel and returning to said processing vessel,--;

Claim 3 (e), column 8, line 2, after "a" delete "value" and insert --valve--;

Claim 3 (e), column 8, line 4, after "materials", delete "are" and insert --as--.

Signed and Sealed this

Sixth Day of May, 1997

Attest:

BRUCE LEHMAN

Attesting Officer     Commissioner of Patents and Trademarks